WASTE, MILLINGTON & HUTCHINS.
Saw Set.
No. 660.   Patented March 28, 1838.
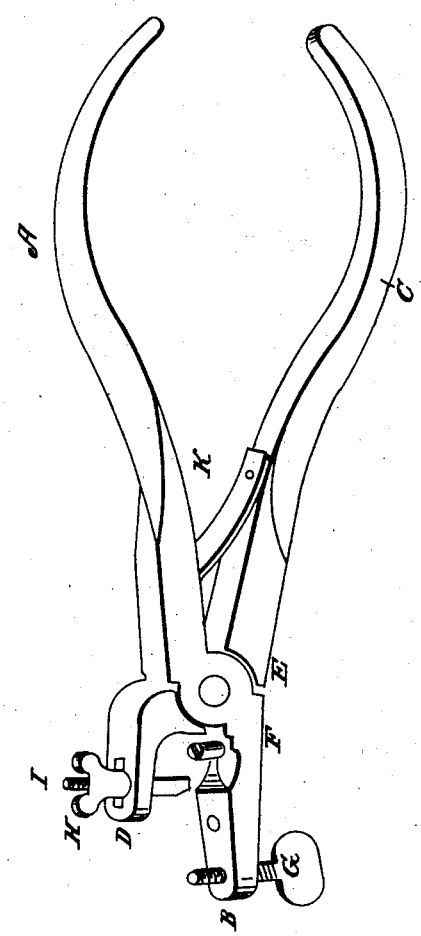
Inventors:
Eli Waste
Norman Millington
Dyer Hutchins

UNITED STATES PATENT OFFICE.

ELI WASTE, OF BENNINGTON, AND NORMAN MILLINGTON AND DYER HUTCHINS, OF SHAFTSBURY, VERMONT.

MACHINE TO SET SAW-TEETH.

Specification of Letters Patent No. 660, dated March 28, 1838.

*To all whom it may concern:*

Be it known that we, ELI WASTE, of Bennington, in the county of Bennington and State of Vermont, and NORMAN MILLINGTON and DYER HUTCHINS, of Shaftsbury, in the county of Bennington aforesaid, have invented a new Machine for Setting Saw-Teeth; and we do hereby declare that the following is a full and exact description.

The nature of our invention consists of two handles with jaws similar to pliers or pincers made of iron, malleable iron or steel and turning on a joint supported by a screw bolt or rivet which screw bolt or rivet is represented at E on the drawings the upper handle is represented by A, and is about five inches long from the joint to the end of the handle and is bent in an oval shape and the top side made in the shape of semicircle so as to sit easy in the hand of the operator. The under jaw is on the opposite end of this handle as may be seen at B and this jaw is about one and one half inches long from the center of the joint to the out end of the jaw. A thumb screw about one inch long and one eighth of an inch in diameter passes through the lower jaw near to the out end of said jaw and there is also another hole cut with a screw about one half of an inch nearer to the joint in which the thumb screw G may be placed for the purpose of setting narrow saws and then the said thumb screw may be shifted back to the hole nearest to the end of the under jaw for the purpose of setting saws that are wider. The use of the thumb screw G is to gage the quantum of set that is desired to be given to the saw. A pin of iron steel or brass about one eighth of an inch in diameter and one half of an inch long is inserted in the lower jaw and projects above the top of the said lower jaw about one eighth of an inch and is about one half inch from the rivet in the joint. This pin is divided into two parts by a small cut in that part which is above the upper part of the lower jaw so that the tooth of the saw may be introduced into the beforementioned cut or slit which cut or slit is vertical or parallel with the thumb screw. This cut serves to keep the saw tooth in the proper place at the time of setting. This pin is represented in the accompanying drawing above the letter F. The lower handle C is made of the same length and shape as the upper one A but the upper jaw which is on the lower handle is not as long as the under jaw and it has a mortice or slot through it in which a tooth or punch is secured by a thumb nut. A spring of thin steel is placed between the handles at K and secured to the lower handle by a small screw or rivet. This spring serves to keep the handles A, C, expanded and consequently the jaws B, D, open. The tooth or punch T is made of steel and the lower end hardened and made in a shape to cover the point of the saw tooth. This tooth or bolt is inserted in the slot or mortice through the upper jaw D, and is made fast in any part of the slot desired according to the length of the saw tooth that is to be operated on. The upper jaw D is about one inch long from the center of the rivet represented above. The letter E and this jaw is about one half inch wide and one fourth of an inch thick. The size and proportions of the saw set may be made greater or smaller to suit the purpose of different artisans.

The method of using the same is to place the teeth of the saw between the jaws B, D and one tooth at each time between the sides of the pin F or in the slit or cut therein and then by a squeeze on the handles A, C, the jaws B D are closed together and the punch T is made to act on the side of the tooth of the saw and is thus bent or set, and in like manner all the teeth in the saw are bent or set to one and the same bevel which bevel is made more or less at pleasure by turning the thumb screw G. The punch T must be adjusted according to the size of the saw tooth that is to be set. This is easily done by means of the thumb nut H and the punch set farther or nearer to the pin F at the wish of the operator.

What we claim as our invention and desire to secure by Letters Patent is—

The combination of the jaws as before described with the handles and the application of the same to the purpose of setting saws.

ELI WASTE.
NORMAN MILLINGTON.
DYER HUTCHINS.

Witnesses:
  CHAS. E. HOUGHTON,
  ANDREW HOUGHTON.